United States Patent [19]
Blackwell et al.

[11] 3,812,227
[45] May 21, 1974

[54] METHOD OF PRODUCING A FLAT TOP SLAB OF FOAMED POLYURETHANE

[76] Inventors: James Brian Blackwell; Dennis Killen; Victor Francis Hodgson, all of Yew St., Stockport, England

[22] Filed: Jan. 21, 1972

[21] Appl. No.: 219,645

Related U.S. Application Data
[63] Continuation-in-part of Ser. No. 719,957, April 9, 1968, abandoned.

[30] Foreign Application Priority Data
Dec. 13, 1967 Great Britain..................... 56752/67
June 9, 1967 Great Britain..................... 26718/67
Apr. 12, 1967 Great Britain..................... 16670/67

[52] U.S. Cl................... 264/54, 264/40, 264/48, 264/55, 264/316, 425/4 C, 425/145, 425/436
[51] Int. Cl....................................... B29d 27/04
[58] Field of Search............ 264/54, 47, 51, 48, 53, 264/40, 316, ; 425/140, 141, 436, 145, 327

[56] References Cited
UNITED STATES PATENTS

| | | | |
|---|---|---|---|
| 3,325,823 | 6/1967 | Boon.............................. | 264/54 X |
| 3,492,693 | 2/1970 | Clarke et al....................... | 425/327 |
| 3,576,935 | 4/1971 | Dyer et al........................ | 264/95 |
| 3,639,550 | 2/1972 | Darmochwal.................... | 264/54 X |
| 3,719,234 | 3/1973 | Petzetakis....................... | 264/54 X |
| 3,091,811 | 6/1963 | Hackert.......................... | 264/48 X |
| 3,240,655 | 3/1966 | Voelker........................... | 264/47 X |
| 3,233,576 | 2/1966 | Voelker........................... | 264/47 X |
| 3,655,311 | 4/1972 | Porter............................. | 264/47 X |

FOREIGN PATENTS OR APPLICATIONS
17,667 10/1966 Japan................................. 264/51

*Primary Examiner*—Philip E. Anderson
*Attorney, Agent, or Firm*—Waters, Roditi, Schwartz & Nissen

[57] ABSTRACT

A method for the continuous production of slabs of polymeric foam. Slabs of foam are produced by depositing liquid foam reactants onto an open-topped continuous trough conveyor and a flat top surface on the foam is achieved by introducing guide sheets between the sides of the trough conveyor and the foam and raising and controlling the guide sheets so that they are always in accurate registration with the rising foam. The guide sheets are introduced downwardly into the trough conveyor and then passed around respective straight fold bars the attitudes of which are adjustable. The guide sheets thereafter follow upwardly-inclined paths, corresponding to the rising level of the foam, and are advanced by pull rolls which are also adjustable in attitude. The positions along the trough conveyor of the fold bars and the pull rolls can be adjusted. Preferably, the guide sheets are sheets of thin plastic material, e.g. polyethylene.

6 Claims, 4 Drawing Figures

PATENTED MAY 21 1974 3,812,227

SHEET 2 OF 2

METHOD OF PRODUCING A FLAT TOP SLAB OF FOAMED POLYURETHANE

OTHER APPLICATIONS

The present application is a continuation-in-part of our co-pending application Ser. No. 719,957 filed Apr. 9, 1968 and now abandoned.

FIELD OF INVENTION

This invention relates to methods for producing polymeric foam slabs.

BACKGROUND

In the production of polymeric foam slabs, intended for subsequent conversion into, for example, mattresses, a mixture of liquid foam reactants is poured onto the bottom of a continuous trough conveyor, the mixture foaming due to chemical reaction and rising to form a cellular structure of solid material. The resultant structure may be more or less resilient or may be rigid.

A well-known and generally employed means of constructing the required trough conveyor is to arrange a pair of rigid side walls in parallel spaced relationship above, but close to, an endless belt conveyor. The belt conveyor and the rigid side walls are then lined with, for example, waxed-paper sheets drawn from supply rolls so that the sheets (sometimes a single sheet is used folded upwardly at each side) constitute a continuous open-topped trough of rectangular cross-section which is transported by the belt and slides past the rigid side walls. Such an arrangement of paper sheets (or a single folded sheet) can be considered as, per se, constituting a continuous trough conveyor. Such an arrangement is well-known but details of one specific arrangement can be found in U.S. Pat. No. 3,152,361 (Edwards).

After the foaming action has ceased the resultant continuous slab of foam material, which may have for example a cross-section two metres wide and one metre high, continues down the conveyor to undergo a curing process and is then cross-sawn into blocks of convenient length. Thus, for as long as the mixture of liquid foam reactants is poured onto the upstream end of the trough conveyor, a slab of cured foam material passes out of the downstream end of the conveyor. With such a high-output continuous process, utilizing relatively expensive starting materials, it is essential that the resultant foam product is of a consistently high quality; in particular that it is free from any surface deformities such as splits and tears and also that the density of the foam is maintained as near uniform as possible.

In order to achieve uniform density of the product, it is essential that the mixture of liquid foam reactants should be free to rise naturally, due to the chemical reaction, without any inhibiting influences. Thus, the aforementioned trough conveyor must be open-topped and the rising foam must not encounter any kind of shaping or limiting means such as a doctor blade or top cover of the trough. However, as is well-known to those informed in the subject art, friction or adhesion occurs between the rising foam and the paper side walls of the trough conveyor resulting in a product which has a convex top surface (as seen in cross-section).

In the subsequent conversion of a foam block (to mattresses or whatever) the ideal cross-sectional shape of the block is rectangular, for maximum economical utilization of the block material. Thus, various proposals have been made for avoiding or overcoming the aforementioned friction or adhesion in an attempt to produce a block which has a flat top and is truly rectangular in section; see for example, U.S. Pat. Nos. 3,123,856 (Dye et al.) and 3,325,823 (Boon).

However, the only proposal which so far has found wide acceptance involves the introduction of an additional sheet or web of material between the rising foam and the paper side walls of the continuous trough conveyor, as first disclosed in U.S. Pat. No. 3,091,811 to Hackert. Such additional sheets are to be moved in a direction and at a speed such that the horizontal component equals that of the conveyed foam and the vertical component is the same as the rising speed of the foam top surface. In other words, said additional sheets are moved along upwardly inclined paths so that no friction (no movement) occurs between the upper regions of the sides of the rising foam and said sheets.

We have sought to provide a method for the continuous production of a slab of polymeric foam which is adapted to the requirements of mass-production factory conditions. As previously mentioned, the reactants constituting the starting materials for such production are relatively expensive so that wastage is unacceptable. Also, in spite of the conditions of continuous mass production, the resultant foam strands must be free of tears or splits at the surfaces, must have a substantially uniform density, and must have a cross-sectional shape which is, as closely as possible, rectangular. Furthermore, such a consistent result must be achieved.

In achieving a rectangular cross-section, it is not, of course, acceptable to employ means which create some other unacceptable characteristic in the resultant product. For example, we are aware of a prior proposal to introduce very narrow belts of material between the side walls of the trough conveyor and the foam, the belts being located only adjacent the top surface of the foam. However, such proposal is not effective in that it necessitates a top cover for the trough conveyor, which inevitably results in foam of non-uniform density.

Our investigations have shown that it is necessary to provide some adjustment, preferably continuous, of the means controlling the path of travel of the additional intervening sheet or web. The position along the trough conveyor at which the liquid foam reactants will start to rise (expand) cannot be predetermined as between successive batches of similar reactants and certainly not as between different successive batches of reactants, as for example when a foam of one resiliency is to be followed by a foam of a different resiliency. Similarly, the rate of rise (or expansion) of the foam cannot be predetermined with accuracy. Consequently, adjustment facilities must be provided to insure that the additional intervening sheet or web (hereinafter referred to as the "guide sheet") can be located and moved in accurate registration with the side of the foam. Furthermore, the conditions of continuous mass production require that the method and apparatus for achieving these desiderata shall be as simple and reliable as possible.

SUMMARY OF INVENTION

A primary object of the present invention is to provide a method for introducing and controlling guide sheets between the rising foam and the side walls of a trough in which the foam is being cured, which method is sufficiently simple so that continuous adjustment of the path of travel of each said guide sheet is facilitated to the extent that acceptable flat-topped foam slabs can be produced continuously in any reasonable and normal circumstances with a minimum of skill or expertise on the part of the operator.

A further object is to provide that each guide sheet shall be passed around a respective straight fold bar prior to functioning to control the shape of the foam.

Another object is to provide that said guide sheets shall be thin sheets of plastic material, preferably polyethylene.

An additional object is to provide automatic control means to control the location of each guide sheet on its respective fold bar.

A further object is to provide that each said guide sheet shall be moved around its respective fold bar by pull rolls the alignment of which, relative to said guide sheet, is controlled automatically.

These and other objects of the invention are achieved in a method of producing a slab of polymeric foam in a continuous open-topped trough conveyor wherein an initially-liquid mixture of foam reactants is permitted to foam freely in a mobile conveyor trough as the trough moves along and guide sheets are introduced between the rising foam and the trough sides in order to prevent friction between the foam and the trough sides. In accordance with the invention, there is provided an improvement comprising introducing each guide sheet downwardly into the trough adjacent the region where foaming begins, folding the guide sheet around a fold bar having an attitude such that the guide sheet is thereby directed along an upwardly-inclined path corresponding to the rising level of the foam, and advancing the guide sheet along said path together with and in contact with the foam. As a result of this improvement, the resultant foam slab is produced with a substantially flat top surface.

In apparatus for producing a slab of polymeric foam in a continuous open-topped trough conveyor, an initially-liquid mixture of foam reactants is permitted to foam freely in the conveyor trough as the trough moves along, and guide sheets are introduced between the rising foam and the trough sides in order to prevent friction between the foam and the trough sides. In this apparatus is provided an improvement comprising, at each side of the trough guide, sheet supply means located adjacent the region where foaming begins, a fold bar located in the trough below said supply means and in an attitude such that, when the guide sheet is introduced downwardly into the trough and folded around said fold bar, the guide sheet will thereafter be directed along an upwardly-inclined path corresponding to the rising level of the foam, and means for advancing the guide sheet along said path together with and in contact with the foam whereby the resultant foam strand will be produced with a substantially flat top surface.

Other objects and advantages of the present invention will become apparent from the following detailed description and by reference to the accompanying drawings. It should be understood, however, that the detailed description and examples, while indicating preferred embodiments of the invention, are given by way of illustration only, since various changes and modifications within the spirit and scope of the invention will become apparent as the description herein progresses.

BRIEF DESCRIPTION OF DRAWING

Reference is now made to the accompanying drawings which form a part hereof, wherein.

DETAILED DESCRIPTION OF INVENTION

Figure 1:
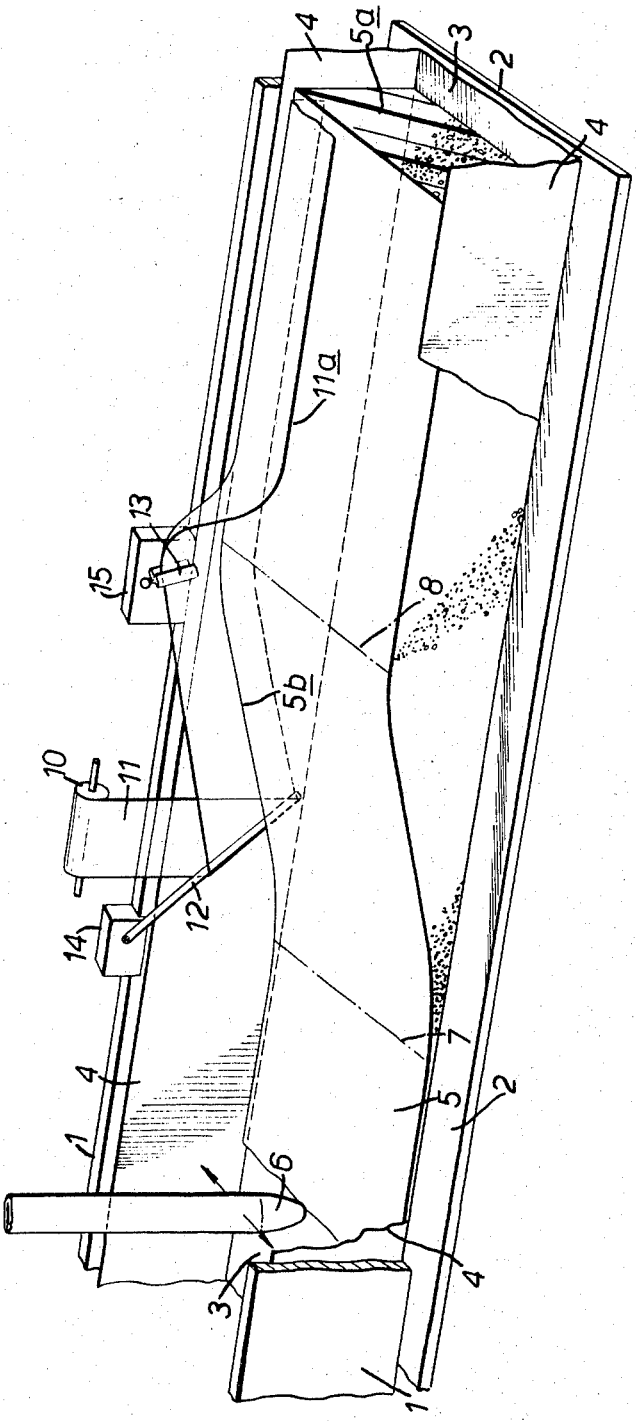
FIG. 1 is a diagrammatic perspective view of apparatus in accordance with the present invention, the nearest side being partially broken away.

The apparatus shown in FIG. 1 comprises a pair of parallel spaced rigid side walls 1 located in stationary relation above but close to an endless conveyor belt 2. A paper trough conveyor comprises a base 3 and side walls 4, the paper sheets constituting the trough being drawn continuously from supply rolls (not shown) and being longitudinally transported by and with the belt 2 from the left to right as seen in the drawing. A mixture 5 of liquid foam reactants is deposited on the bottom of the trough conveyor from a nozzle 6 feeding from a mixing head (not shown). The nozzle is reciprocated, as indicated by arrows, across the trough conveyor in order to deposit an even layer of foam reactants onto the bottom of the conveyor. Although some reaction takes place initially, the foam reactants perceptibly start to expand and rise at what is termed the "cream line" indicated by chain line 7. Thereafter, the top surface of the foam rises due to chemical reaction until the foam reaches a condition of maximum expansion; that is the point of "full rise" indicated by the chain line 8. Thereafter, the fully expanded foam slab (seen in section at 5a) continues along the trough conveyor to a position (not shown) where it is fully cured and subsequently cross-sawn into utilizable lengths.

In the foaming region, that is the region of the trough conveyor between the lines 7 and 8, is located a supply roll 10 of material constituting a guide sheet 11. An example of a suitable material is polyethylene sheet of about 0.06 mm. thickness, having a specific weight of 0.918 and a melt index of from 1.5 to 2.0. (The melt index of polyethylene is the weight in grams of material pressed through a circular orifice of 2.1 mm. diameter by a weight of 2.1 kilograms at a temperature of 190° C during a period of 10 minutes). Also provided is a folding bar 12 and pull rolls 13. The folding bar 12 is supported and controlled from a mechanism indicated at 14 and the pull roll 13 is supported and controlled from a mechanism indicated at 15. The details of the mechanisms 14 and 15 will be illustrated and explained hereinafter. The guide sheet 14 is introduced in a vertical direction into the trough conveyor and is folded around the folding bar 12 from which it extends along an upwardly-inclined path through the foaming region to pull rolls 13, the rolls engaging the upper edge of the sheet 11. Although not shown, a similar arrangement is also provided on the opposite side of the trough conveyor.

The surface speed of the pull rolls 13 is related to the speed of the conveyor belt 2. The pull rolls 13 pull sheet 11, from the supply roll 10, around the folding bar 12 and thereafter along a path which is made to correspond to the top surface 5b of the expanding foam 5. The path of the guide sheet 11 will depend upon the respective attitudes, and positions along the trough conveyor, of the folding bar 12 and the pull rolls 13, as will be explained hereinafter.

When the guide sheet 11 has passed through the pull rolls 13, the part of the sheet extending above the top surface of the fully-expanded foam is allowed to fall limply over the top of the foam, as indicated at 11a. Thus the guide sheet, after rising with the foam until the end of the foaming region, thereafter remains in contact with the fully-expanded foam until the foam has cured sufficiently to permit the guide sheet to be removed without damaging the foam surface.

Figure 2:
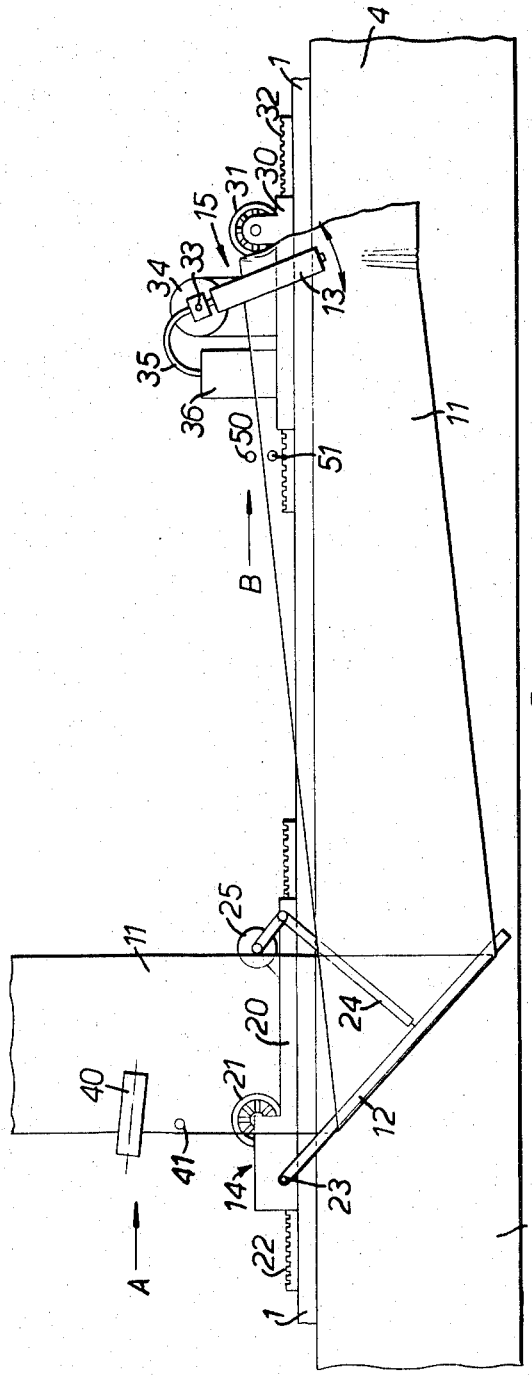
FIG. 2 is a side elevational section along the longitudinal center line of FIG. 1 showing some details not given in FIG. 1 but omitting the foam.

In FIG. 2, it is additionally seen that the mechanism 14 comprises a saddle-unit 20 movable by means of a hand wheel 21 along a rack 22 attached to the top of the rigid side wall 1. The fold bar 12 is pivotally attached at 23 to the unit 20 and is pivotally adjustable by means of an arm 24 which can be reciprocated by a motor 25.

The mechanism 15 comprises a saddle-unit 30 movable by means of a hand wheel 31 along a rack 32 attached to the top of the rigid side wall 1. The pull rolls 13 form part of an assembly which is pivotally attached at 33 to the shaft of a positional motor 34 and the rolls 13 are rotated through a flexible drive 35 by a motor 36.

Thus, the saddle-units 20 and 30 can be positioned independently along the trough conveyor; the attitude of fold bar 12 can be adjusted through appropriate energization of motor 25; and the attitude of pull rolls 13 can be correspondingly adjusted (as indicated by arrows) by appropriate energization of motor 34. Consequently, the upwardly-inclined path of travel of the guide sheet 11 can be continuously controlled to insure accurate registration between the guide sheet and the contiguous foam notwithstanding alteration of the position where foaming commences or the rate of rise of the foam. The degree of accuracy achieved in maintaining registration between the sheet and the foam will, of course, depend upon the skill and experience of the operatives concerned. It should be noted that the hand wheels 21 and 31 can be replaced by motors in order to achieve maximum automation of the apparatus. Also, the motors 25 and 34 can be replaced by hand wheels if a greater degree of manual control is desired.

Figure 3:
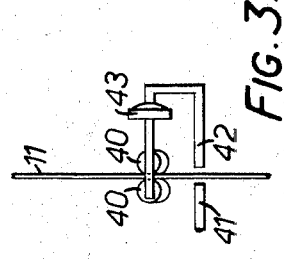
FIG. 3 is a detail as seen in the direction of arrow A in FIG. 2.

Referring to the fold bar 12, the guide sheet 11 will exhibit a tendency to drift along the fold bar (to the right as seen in FIG. 2). The invention provides for automatic correction of this tendency through a pair of idler rolls 40 whose rotational axes are set at a small advanced angle (e.g. 10°) relative to the perpendicular to the normal direction of travel of the guide sheet 11. The rolls 40 are normally held out of contact with the guide sheet 11, by virtue of the edge of the guide sheet interrupting a flow of air from a port 41 (see also FIG. 3). Any tendency of the guide sheet to run off the fold bar 12 moves the guide sheet to the right (as seen in FIG. 2) so as to uncover the port 41. This allows air to flow to a port 42 and actuate a diaphragm 43 which moves the rolls 40 together to pinch the guide sheet. Thenceforth the guide sheet tends to travel in a direction perpendicular to the axes of rolls 40. This corrects the position of the guide sheet on the fold bar 12 until the edge of the guide sheet again interrupts the air circuit to release the rolls 40.

Figure 4:
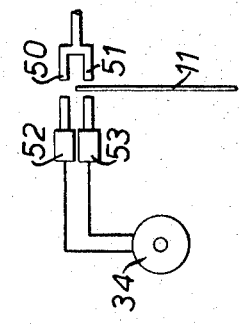
FIG. 4 is a detail as seen in the direction of arrow B in FIG. 2.

Referring to the pull rolls 13, it is desirable that the upper edge of the guide sheet 11 shall pass between the pull rolls at a predetermined location along the axes of the pull rolls. The actual location of said upper edge will vary in dependence upon the angle of the pull rolls relative to the direction of said upper edge of the guide sheet. The invention provides for automatic adjustment of the location of the upper edge of the guide sheet by providing two air ports 50 and 51 (see also FIG. 4) connected to an air supply. When the guide sheet is correctly located, its upper edge covers the port 51 but does not cover the port 50. In this condition air-actuated switches 52 and 53, connected in the energization circuit of motor 34, are open and the motor is stationary. If the sheet 11 rises, the air supply to switch 52 is cut off and the switch operates to drive the shaft of motor 34 clockwise. The pull rolls 13 are thus pivoted so that the sheet 11 moves down to its normal position. If the sheet moves down sufficiently to uncover the port 50, air is supplied to switch 53 which operates to drive the shaft of motor 34 counter-clockwise so that the guide sheet 11 is raised to it normal position.

EXAMPLE I

In an example of carrying out the method of the invention to produce a polyether flexible foam slab, apparatus as shown and described with reference to FIGS. 1 to 4 was employed. A mixture of foam reactants was distributed in the trough conveyor from the nozzle 6, the mixture consisting of:

| | parts by weight |
|---|---|
| Polyether Triol (Polypropylene Glycol) (Union Carbide Polyol L-56) | 100.00 |
| Water | 3.20 |
| Triethylene Diamine (DABCO) | 0.10 |
| Silicon Surfactant (Union Carbide L-540) | 1.50 |
| Stannous Octoate-Catalyst (T-9) | 0.20 |
| Toluene di-Isocyanate (Index 105) | 42.00 |

As the mixture commenced foaming from an observed cream-line 7, a guide sheet 11 of polyethylene of thickness 0.06 mm., specific weight 0.918 and melt index 1.8, was drawn downwardly at each side of the trough conveyor and folded about a respective fold bar 12 so that each sheet thereafter was transported along an upwardly inclined path. Transportation of the sheets was effected by respective pull rolls 13 and, after passing through the pull rolls, the part of each sheet extending above the surface of the expanded foam was allowed to fall freely on the foam surface. At each side of the conveyor, the respective hand wheel 21 was operated to position the fold bar 12 and guide sheet 11 about 2 meters downstream from the cream-line 7. Similarly the respective hand wheel 31 was operated to position the pull rolls 13 about 1 meter upstream from the full-rise line 8. Each motor 25 was then operated to adjust the attitude of its fold bar 12 and each motor 34 was operated to adjust the attitude of its pull rolls 13 so that the respective guide sheets 11 moved in accurate registration with the rising top surface of the foam. The rising foam was kept under observation and any alteration of the path followed by the top surface of rising foam was compensated for by corresponding alteration of the paths of the guide sheet 11, by adjustment of the appropriate one or more of the aforementioned controls.

In order to check the registration between a guide sheet 11 and the top surface of the foam, an ink marking pen was applied to the downwardly-moving polyethylene sheet ss as to produce a straight ink line extending along the upwardly-inclined sheet just above the foam top surface. Appropriate adjustments were then made to the apparatus to insure that the ink line extended parallel to the foam top surface.

After the expanded foam had cured sufficiently, the polyethylene sheets were removed from the foam together with the paper sheets constituting the trough conveyor. Due to the action of the polythene sheets, the resultant foam slab had a rectangular cross-section. Furthermore, the foam was free of any surface splits or tears and the density throughout the foam was uniform.

EXAMPLE II

In order to produce a slab of polyester flexible foam, the steps of Example I were carried out with a mixture of foam reactants consisting of:

| | parts by weight |
|---|---|
| A polyester of adipic acid, di-ethylene glycol and a triol (e.g. glycol), said polyester having a hydroxyl number of about 56 and an acid number of about 1 | 100.00 |
| Mixture of 80% 2-4, toluene diisocyanate and 20% 2-6, toluene diisocyanate | 49.00 |
| Water | 3.5 |
| Methyl ammonium oleate | 0.80 |
| Sulphonated castor oil | 1.7 |
| A tertiary amine type DB (di butyl benzyl amine) | 0.5 |
| N-coco-morpholine | 0.65 |
| N-ethyl-morpholine | 2.1 |

EXAMPLE III

In order to produce a slab of polyether rigid foam, the steps of Example I were carried out with a mixture of foam reactants consisting of:

| | parts by weight |
|---|---|
| Polypropylene ether, hydroxyl number about 490 | 100.00 |
| Mixture of 80% 2-4, toluene diisocyanate and 20% toluene diisocyanate | 65.00 |
| N,N,N',N'tetra methyl 1,3 butane diamine | 0.75 |
| Silicone oil | 0.6 |
| Trichlorofluoromethane | 30.00 |

Modifications of the aforedescribed embodiment are possible within the spirit and scope of the appended claims. For example, the material of the guide sheets 11 might be felt or paper instead of a plastics material. The guide sheets could be introduced into the trough conveyor not vertically but at an angle to the vertical direction. Insofar as both sides of the rising foam are likely to behave in the same way, the corresponding adjustment controls on each side of the trough conveyor might be linked so that adjustment of a control on one side of the conveyor will also produce adjustment of the corresponding control on the other side of the conveyor. Furthermore, the automatic control arrangements described with reference to FIGS. 3 and 4 might include photoelectric sensors rather than the described pneumatic sensors.

What is claimed is:

1. In a method of producing a slab of polymeric foam in a continuous open-topped trough conveyor wherein an initially-liquid foamable polyurethane reaction mixture is permitted to foam freely between regions whereat foaming is effectively initiated and completed in a longitudinally moving conveyor trough and guide sheets are introduced between the rising foam and the trough sides in order to prevent friction between the foam and the trough sides, the improvement comprising introducing each guide sheet downwardly into the trough through the open top thereof towards its bottom at a location adjacent the region where foaming begins, folding the guide sheet around a fold bar having an attitude such that the guide sheet is thereby directed along an upwardly-inclined path corresponding to the rising level of the foam, advancing the guide sheet along said path together with and in contact with the foam, adjusting the attitude of said fold bar to maintain the upwardly-inclined path of the guide sheet in correspondence with the rising level of the foam, and keeping the guide sheet in contact with the foam after the foam leaves the foaming region, whereby a foam slab is produced with a substantially flat top surface.

2. The improvement as claimed in claim 1, comprising engaging the upper edge of the guide sheet with pull rolls positioned adjacent the region where foaming is completed and adjusting the attitude of said pull rolls relative to the guide sheet in dependence upon the attitude of said fold bar.

3. The improvement as claimed in claim 1, comprising engaging the upper edge of the guide sheet with pull rolls positioned adjacent the region where foaming is completed and adjusting the location along the trough conveyor of said fold bar and said pull rolls to compensate for shifting of the regions where foaming begins and ceases.

4. The improvement as claimed in claim 1, comprising sensing deviation of the guide sheet, from its downward path of travel and returning the guide sheet to its original path in response to such sensed deviation.

5. The improvement as claimed in claim 1, comprising engaging the upper edge of the guide sheet with pull rolls positioned adjacent the region where foaming ceases, sensing deviation of said upper edge from said upwardly inclined path of travel, and returning the guide sheet edge to said upwardly inclined path of travel in response to such sensed deviation by adjusting the angular relationship between said guide sheet edge and the rotational axes of said pull rolls.

6. The improvement as claimed in claim 1 wherein said guide sheet is introduced downwardly into the trough at a location downstream of the region where foaming begins.

* * * * *